Patented May 27, 1930

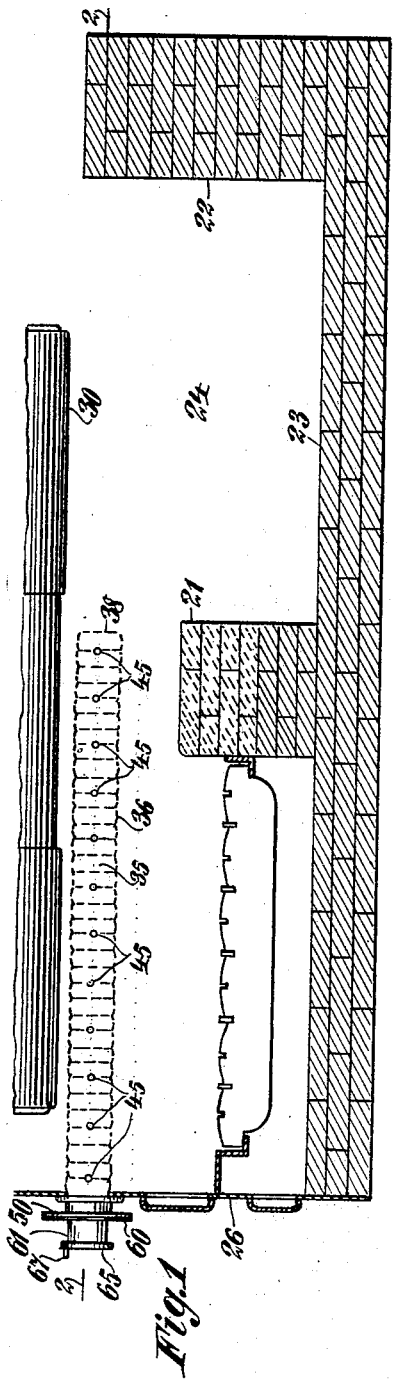
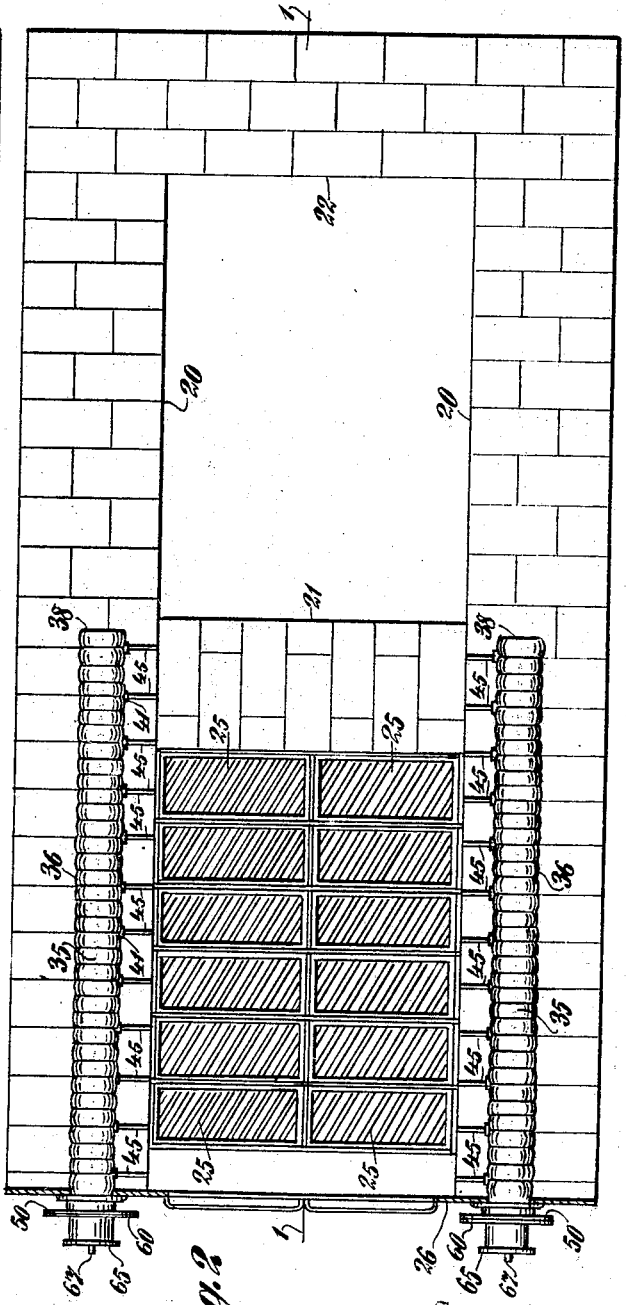

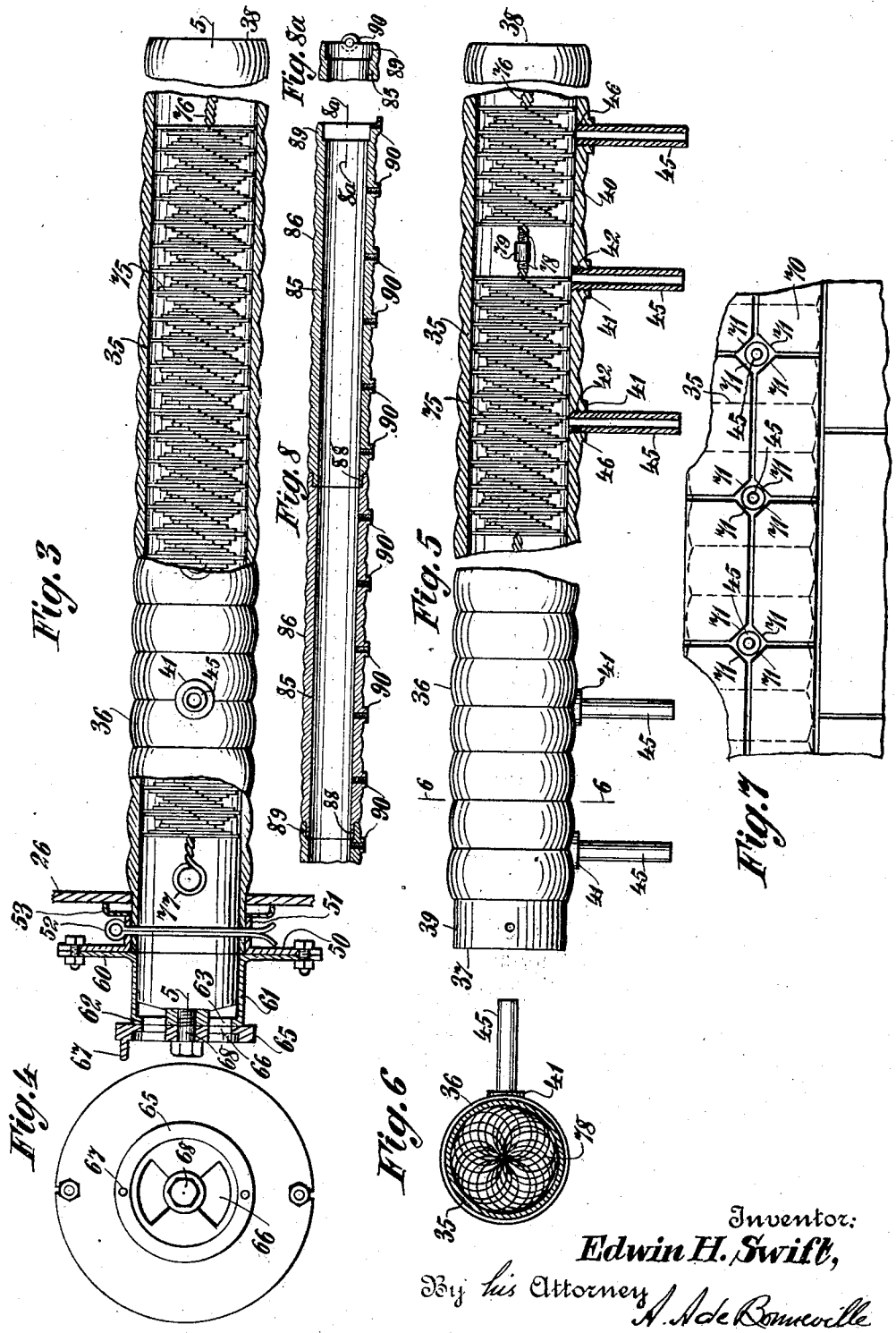

1,760,183

UNITED STATES PATENT OFFICE

EDWIN H. SWIFT, OF BROOKLYN, NEW YORK

AIR INDUCER AND PREHEATER FOR FURNACES

Application filed October 26, 1926. Serial No. 144,299.

This invention relates to an air inducer and pre-heater for a furnace.

The present invention is an improvement of my invention for an air heater and inducer for a furnace described in my Letters Patent of the United States numbered 1,525,419 and dated February 3rd, 1925.

The object of the present invention is the production of an air inducer and pre-heater, by means of which heated air is supplied in a plurality of jets or streams, to the unconsumed products of combustion of the fuel of a furnace, to secure the complete combustion thereof. A second object of the invention is to provide heated air to the whole area of the burning fuel of a furnace at a predetermined velocity of inflow, by means of which the oxygen of the inflowing air easily combines with the unconsumed gases generated, and avoids chilling the bed of the fuel in the furnace. A third object of the invention is the production of means, whereby the escape of obnoxious gases from the combustion chamber of a furnace is prevented. A fourth object of the invention is the production of an air inducer and heater having induction tubes, whereby a maximum circumferential surface is obtained to transmit heat to the air in said tube.

The organization of the invention comprises an induction tube or a pair or plurality of them for the inflow of air into a furnace. The tubes are located in the side walls of the furnace and are provided with spray nozzles, to direct heated air in a plurality of jets or streams over the bed of the fuel of the furnace. A heating coil is detchably located in each tube to impart to the inflowing air therein a twirling movement, before it enters the combustion chamber of the furnace, in addition to the heat that is imparted to the said air, from the fuel of the furnace. The induction tubes are corrugated on their outer circumferential surface, to provide a maximum outer surface, for the transmission of heat to the interior thereof. A damper is provided for each tube to control the inflow of air therethrough.

In the accompanying drawings Fig. 1 represents a vertical section as on the line 1, 1 of Fig. 2 of a furnace for a boiler, with a fragmentary portion of a boiler and the air inducer and heater in place, in one of the side walls of the said furnace; Fig. 2 shows a top plan view of a pair of the air inducers and heaters with the brick walls of the furnace parted on about the line 2, 2 of Fig. 1; Fig. 3 indicates an enlarged partial side elevation and axial section of the induction tube of the inducer and heater with its appurtenances; Fig. 4 represents a left hand view of Fig. 3; Fig. 5 indicates a partial plan view and partial longitudinal section of Fig. 3 on the line 5, 5; Fig. 6 is a section of Fig. 5 on the line 6, 6; Fig. 7 shows an enlarged fragmentary portion of Fig. 1. Fig. 8 represents a horizontal longitudinal section of some modified details and Fig. 8ª indicates a section of Fig. 8 on the line 8ª, 8ª.

A furnace is indicated with the side walls 20, bridge wall 21, rear wall 22 and bottom wall 23. The combustion chamber is shown at 24. The grates of the furnace are represented at 25 and the front of the furnace is shown at 26. A fragmentary portion of a boiler is shown at 30. The inducer and heater in this instance comprises a pair of induction tubes, each indicated in its entirety by the numeral 35. Said tubes may be made of metal or refractory material. Each of said tubes has formed therewith the corrugated outer circumferential surface 36, to provide the maximum heating surface therefor. The ends 37 and 38 of each tube are open, and a portion 39 at one end of each tube is cylindrical on its outer circumferential surface. The bore or inner surface 40 of each tube is cylindrical and of the same diameter throughout. Bosses 41 are formed with the outer surface of each tube and threaded openings 42 extend through said bosses and the shells of the tubes. Spray outlet nozzles 45 of refractory material, preferably of what is known commercially as lava rock, have a threaded portion 46 at one end of each. The latter are in threaded engagement with the threaded openings 42 of the induction tubes. The portion 39 of each tube 35 extends through an opening in the front 26 of the furnace. A flange 50 having the sleeve 51 is supported on the portion 39 of each tube, and is maintained in place by the split pin 52. A collar 53 is supported on the portion 39 of each tube and bears between the end of the sleeve 51 and the front 26. A damper is indicated to comprise the flange 60 with the sleeve 61, having the head or outer wall 62. Openings 63 are formed in the head 62. A rotatable damper plate 65 having the openings 66 and the projecting and operating pin 67 is rotatably connected to the head 62, by means of the screw pivot 68.

A portion of the fire brick of the walls of the furnace are indicated at 70, each of which is chamfered at one of its corners 71, to provide clearance for the spray outlet nozzles 45. Fire clay is preferably forced into the space between the faces of said chamfered portions and the nozzles 45.

A heating coil 75 is located in each of the induction tubes 35. The coil comprises in this instance a core 76, that consists of a coil of wires, that extends the full length of the induction tube, preferably with an eye 77 formed at one end thereof. The coil proper comprises a series of wire rings or loops 78 which each are clamped at one portion between the wires of the core. The rings or loops follow each other in a helical path from adjacent to the eye 77 to the other end of the core.

The core may be made in two or more lengths as particularly indicated in Fig. 5. In this case the wires of the core at their ends are welded together and threaded as indicated at 78, and a coupling 79 connects said threaded ends whereby a length of the core may be replaced by a new one when required. In place of the induction tubes 35 each of which are made of one length, the induction tubes may each consist of a plurality of sections as shown in Figs. 8 and 8ª. In this modification a pair of sections are indicated locked to each other. Each of said sections is indicated at 85 and has formed therewith the corrugated outer circumferential surface 86. Each of the sections 85 has formed therewith the male end 88 and the female end 89. The male end of one section locks with the female end of the next adjacent section. Bosses 90 similar to 41 are formed with each section for the spray outlet nozzles 45 already described.

To use the heater, the dampers 65 are rotated to locate the openings 66 thereof in proper position, to admit the requisite volume of air in each of the tubes with the requisite velocity. The air as it flows through each of said tubes 35 is twirled in a helical path and also takes a longitudinal direction in the spaces between the separate coils of the heating coil. The air while in the tubes is preheated by the heat provided by the combustion of the fuel on the grates 25. The heat is transmitted through the fire brick of the walls of the furnace, and is then discharged through the openings of the spray outlets 45. By means of the coil in each tube 35 the induced air is thoroughly heated throughout all portions thereof, before it enters the furnace over the fuel on the grates 25, and is delivered at a proper temperature therein for the combustion of the oxygen of the unconsumed gases of the products of combustion. By this means complete combustion is obtained with a great saving of fuel, and obnoxious gases are prevented from escaping from the furnace.

It is to be noted that the loops or wires 78 for the coil in this instance are double threaded, but the core of the coil may have extending therefrom a single coil of rings or loops, or the core may have a plurality of coils extending therefrom each in a helical path.

Having described my invention what I desire to secure by Letters Patent and claim is:

1. In an air inducer and pre-heater the combination of an air induction tube, a heating coil detachably located in the tube, said coil comprising a plurality of lengths of coils, a core for each length of coil, a series of loops extending from each core following each other in a helical path, the ends of the core of each length of coil welded together and threaded and a coupling connecting the threaded ends of the cores, said couplings enabling the lengths of the core to be replaced.

2. The combination of the walls of a furnace, an induction tube located in each wall, each induction tube having a corrugated outer surface to increase the heating surface thereof, a plurality of spray outlets detachably extending from each tube to the inner face of the wall containing the tube, a damper in one end of each tube, a plurality of lengths of heating coils in each tube, each length of coil comprising a core and a series of hooks or rings extending from each core, said series of hooks or rings following each other in a helical path.

3. In combination the walls of a furnace, a front abutting against one end of said walls, an induction tube open at its ends and having a corrugated outer circumferential surface supported in one of said walls, a portion at one end of the tube cylindrical on its outer circumferential surface, said portion extending through an opening in said front, a sleeve having a flange formed therewith detachably supported on said cylindrical portion, a second sleeve having a flange formed therewith detachably connected to the first flange, a damper located at the outer end of the second sleeve, outlet nozzles detachably connected to the induction tube with their outer ends extending to the inner face of said wall and a heating coil located in said tube.

In testimony whereof I affix my signature.

EDWIN H. SWIFT.